Dec. 14, 1943.   C. L. OTT   2,336,955
GRINDING MACHINE
Filed Sept. 19, 1941   6 Sheets-Sheet 1
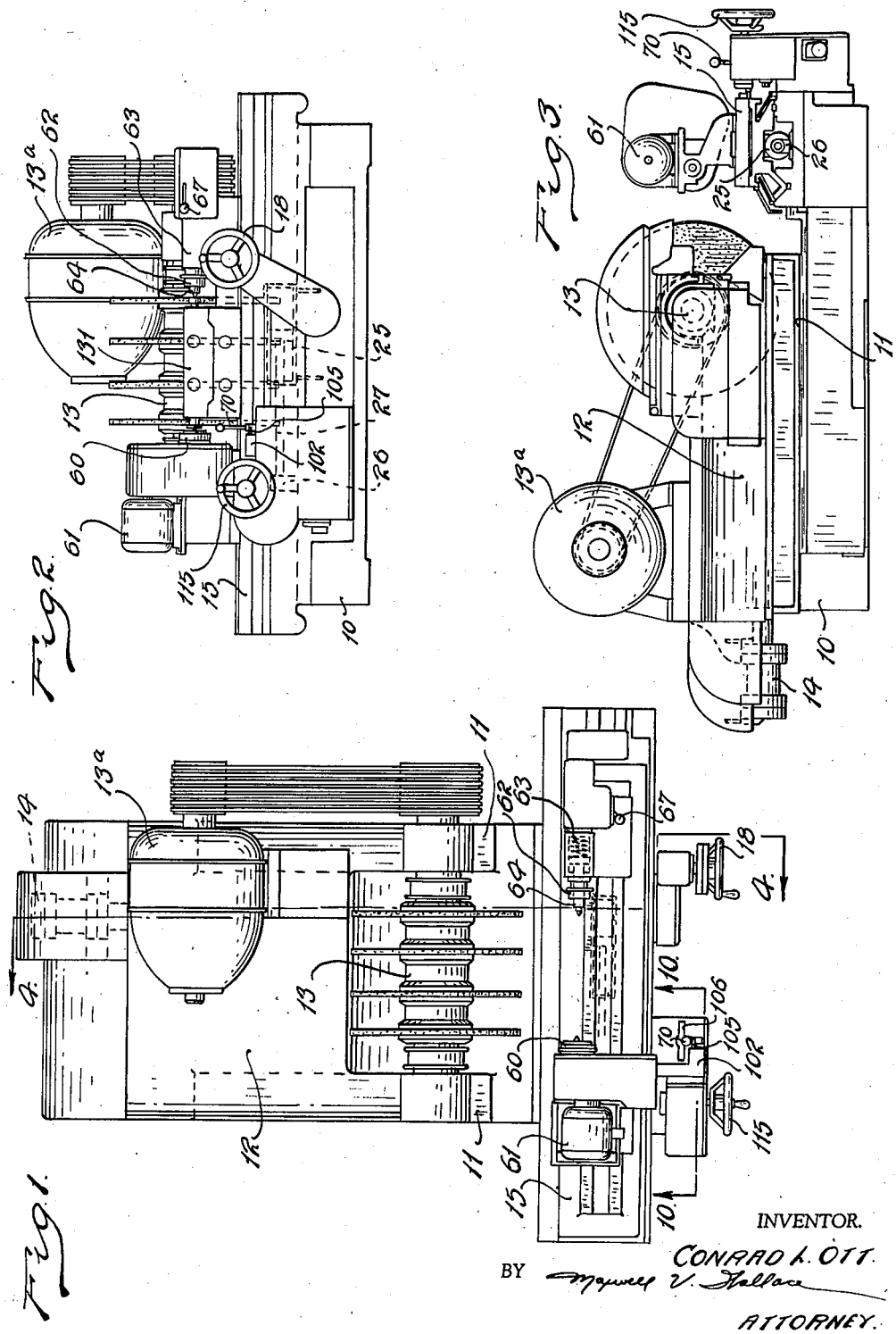
INVENTOR.
CONRAD L. OTT.
BY
ATTORNEY.

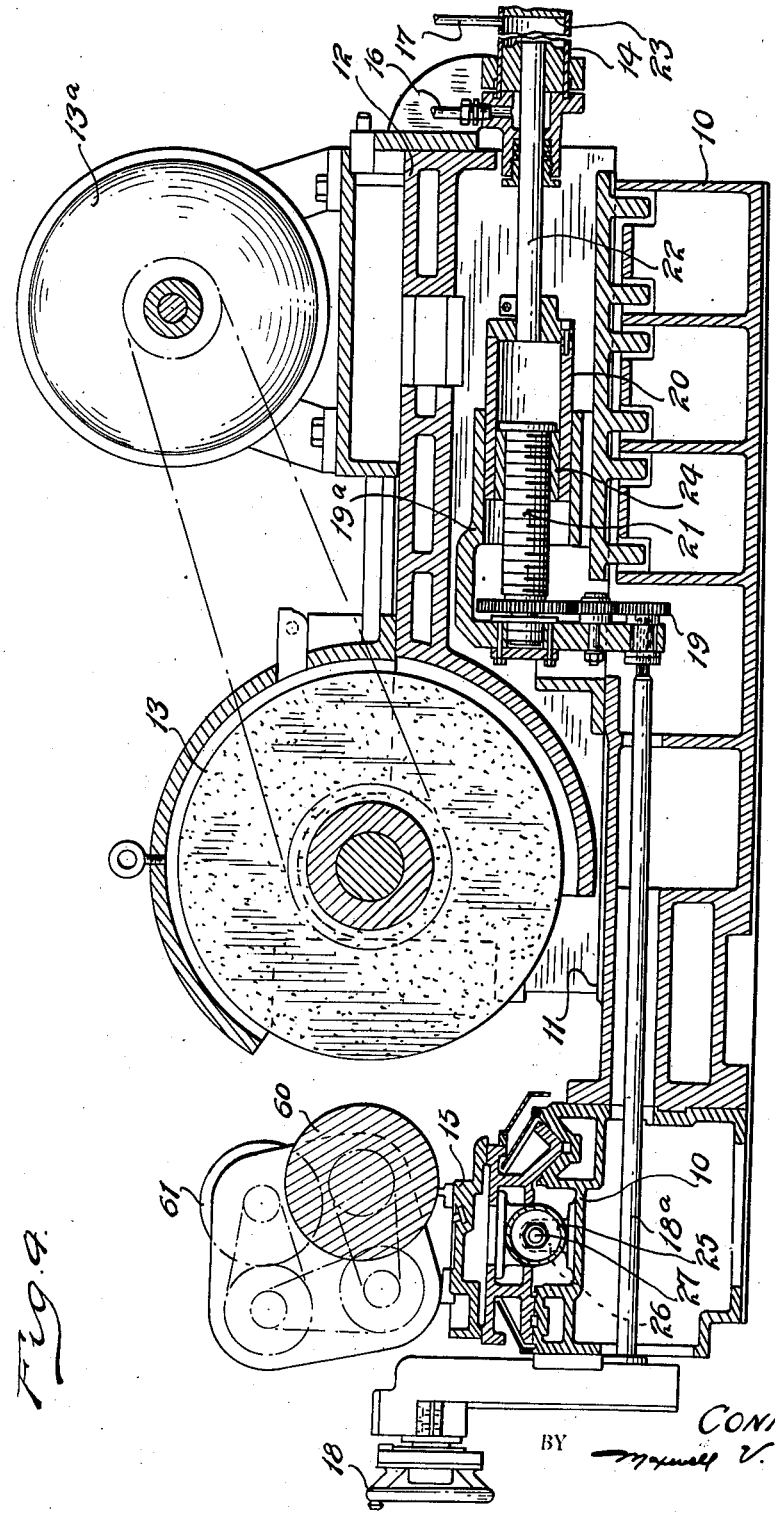

Dec. 14, 1943.   C. L. OTT   2,336,955
GRINDING MACHINE
Filed Sept. 19, 1941   6 Sheets-Sheet 3
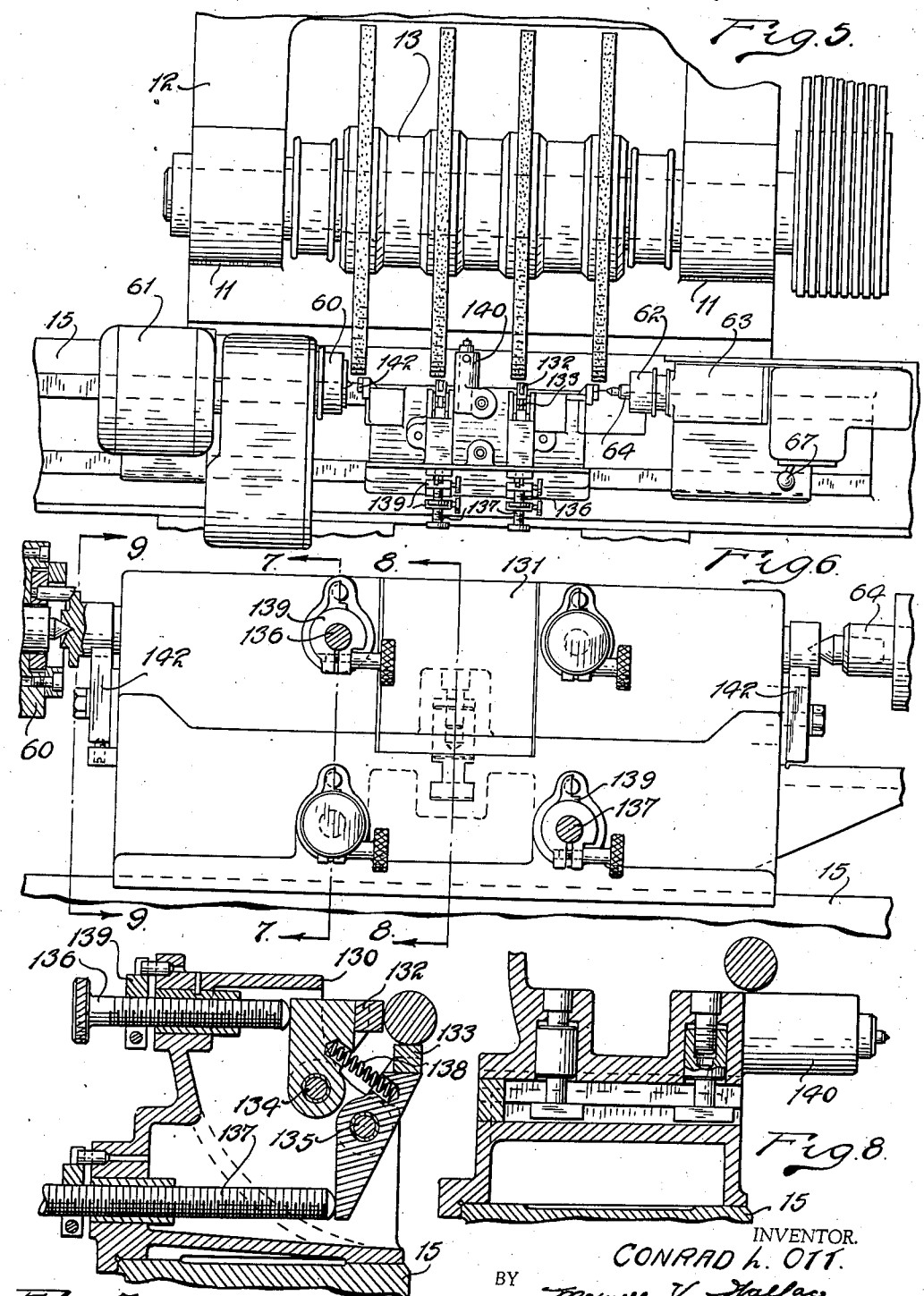
INVENTOR.
CONRAD L. OTT.
BY Maxwell V. Wallace
ATTORNEY

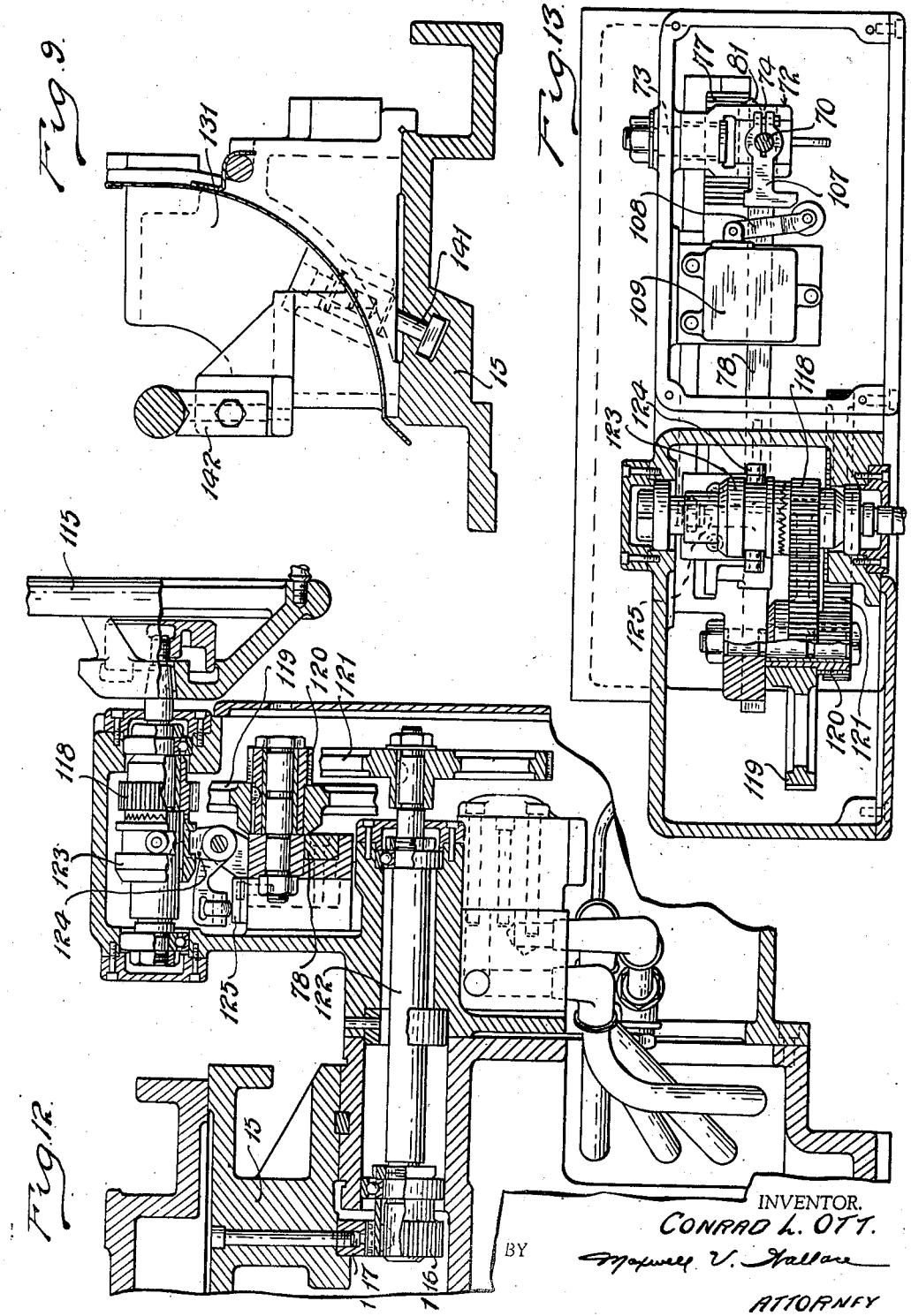

Dec. 14, 1943.   C. L. OTT   2,336,955
GRINDING MACHINE
Filed Sept. 19, 1941   6 Sheets-Sheet 5
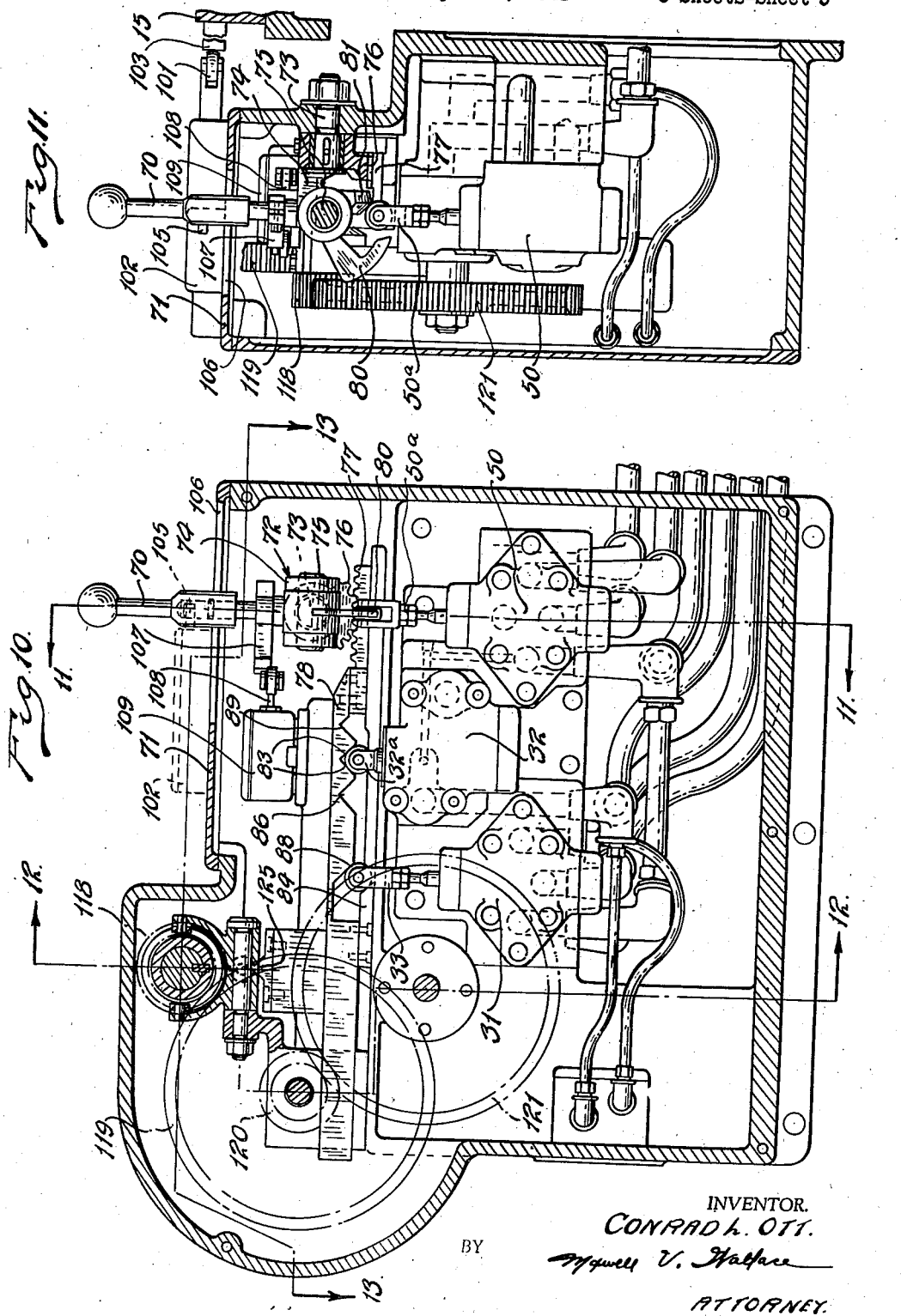
INVENTOR.
CONRAD L. OTT.
BY
Maxwell V. Wallace
ATTORNEY.

Dec. 14, 1943.   C. L. OTT   2,336,955
GRINDING MACHINE
Filed Sept. 19, 1941   6 Sheets-Sheet 6
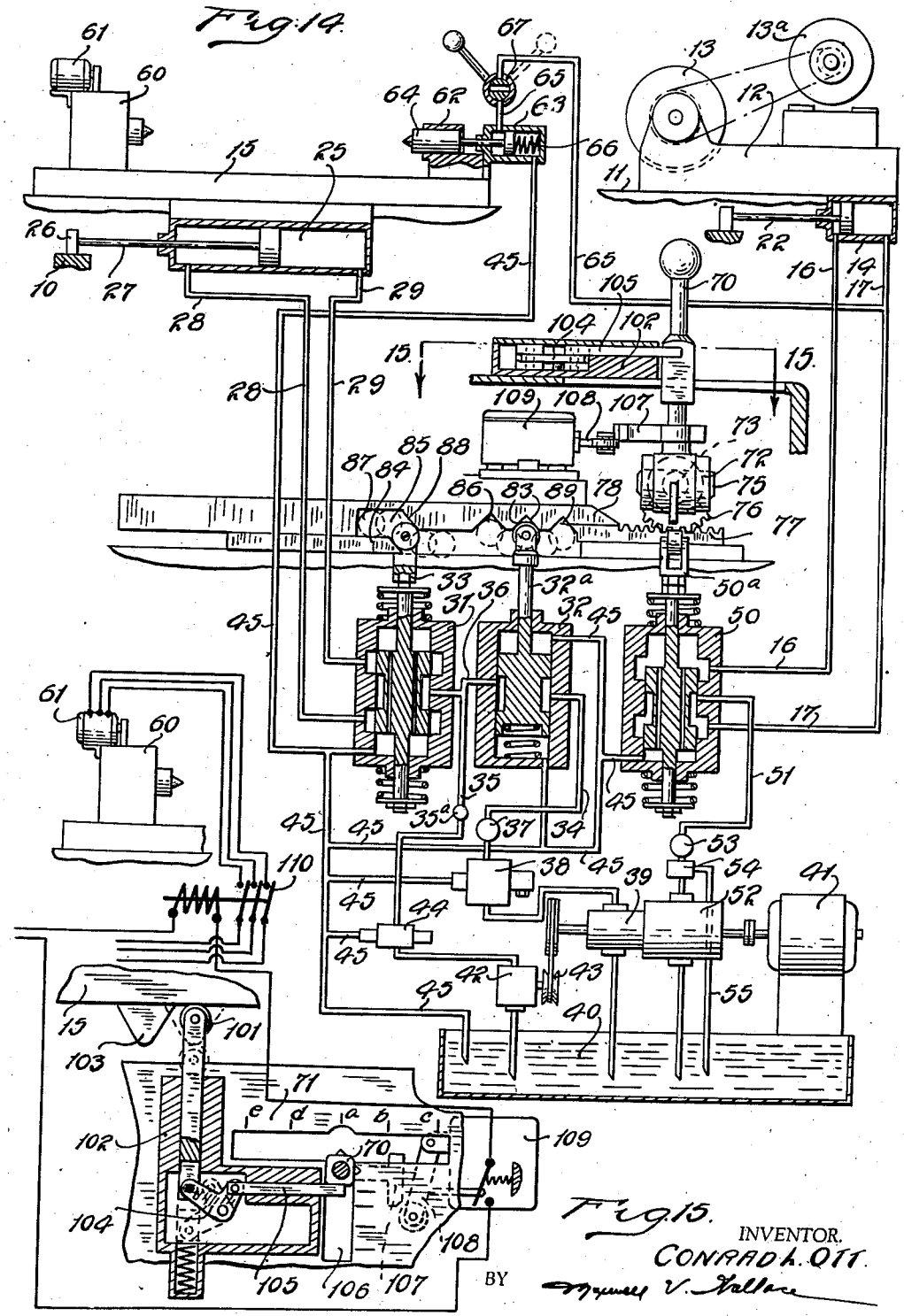

Patented Dec. 14, 1943

2,336,955

UNITED STATES PATENT OFFICE 2,336,955

GRINDING MACHINE

Conrad L. Ott, Detroit, Mich.

Application September 19, 1941, Serial No. 411,539

7 Claims. (Cl. 51—95)

This invention relates to actuation and control mechanism for machine tools, and is particularly applicable to machines known generally as grinding machines.

In effecting satisfactory operation of modern machine tool equipment it is important that movements of various parts such as work carriages, tool feeds, and other moving parts necessary to complete various operations, be completed quickly and positively, and if not fully automatic, then under the complete control of the operator, who should be able to control the several movements with a minimum of effort so that he will be free to watch the operation of the machine and be able to accomplish other important duties.

As an illustration of the application of the principles of the invention a unit as applied to a machine for simultaneously grinding a plurality of diameters, such as are found on an automotive camshaft, is shown and described.

A principal object of the invention herein disclosed is to provide a control operable by a single actuating control or lever which will nevertheless be capable of selectively producing various movements in the machine at the will of the operator by moving the lever to predetermined positions.

It is a further object to make possible a centralized power control for the movements of a machine tool with the minimum number of moving elements.

It is a still further object to provide a plurality of movements under the selective control of the operator by manipulation of a single manual control without the necessity of moving from one control to another.

It is another object to provide a single sliding tool support member for carrying a plurality of tools, such as rotating grinding wheels, with power means to actuate the tool slide both toward and away from the work and also provided with means for manually adjusting the position of the tool support member.

It is a further object to make possible the operation of a grinding machine by a single control or lever which controls the grinding wheel slide, the work carriage movement in two speeds, and controls also the rotation of the work.

It is another object to provide a grinding machine wherein the work can only be placed in the machine when the grinding wheel base is withdrawn from the work.

It is a further object to improve operation and safety of a grinding machine by means which assures that the grinding wheels cannot be brought up to the work until the work and grinding wheels are in proper alignment.

It is a further object to improve the work support and work carriage by the provision of improved back rest and controlled movement of the carriage at various speeds of movement.

The above and other objects of the invention will appear more fully from the following more detailed description, and by reference to the accompanying drawings forming a part hereof, and wherein:

Fig. 1 is a plan or top view of a grinding machine selected to illustrate the application of the principles of the invention.

Fig. 2 is a front view of the grinding machine showing the general location of the controls and other parts.

Fig. 3 is a side view of the grinding machine.

Fig. 4 is a view partly in section taken substantially on the line 4—4 of Fig. 1 and shows the control and actuating means for moving the wheelbase toward and away from the work.

Fig. 5 is a top or plan view showing the grinding wheels and work carriage.

Fig. 6 is a front view of the work carriage and adjacent parts.

Fig. 7 is a cross section taken substantially on line 7—7 of Fig. 6 and shows details of the back rest jaws.

Fig. 8 is a section on line 8—8 of Fig. 6.

Fig. 9 is a section on line 9—9 of Fig. 6.

Fig. 10 is a view of the control box with cover removed and is taken substantially on line 10—10 of Fig. 1.

Fig. 11 is a view taken on the line 11—11 of Fig. 10 and shows an end view of the control box.

Fig. 12 is a view on line 12—12 of Fig. 10 and shows details of the manual means for actuating the work carriage.

Fig. 13 is a view taken on line 13—13 of Fig. 10 with cover removed and shows a top view of the control box.

Fig. 14 is a diagram of the control circuit, including certain details of the valves, hydraulic system and actuating mechanism in diagrammatic form.

Fig. 15 shows a partially diagrammatic view of the safety device preventing the tool carriage from being brought toward the work until the grinding wheels are in alignment with the work and, also shows a diagram of the electrical circuit whereby the headstock motor is started at the proper time to rotate the work as the grinding wheels approach it.

Referring to Figs. 1, 2, 3 and 4 of the drawings, there is shown a grinding machine having a bed 10 and a wheel or tool slide 11 and a tool carriage 12 on which is mounted a grinding wheel assembly 13 driven by motor 13a, there being shown four grinding wheels in Figs. 1, 2 and 3, it being understood that as many wheels as necessary may be employed, all carried by the same carriage 12. Also mounted on the bed of the machine is a work carriage 15, which is shown by Figs. 1, 2, 3 and 4 is mounted to slide in a direction at right angles to the travel of the tool carriage 12. A hydraulic cylinder and piston unit 14 is shown in Fig. 4, for the purpose of actuating the tool or wheel slide 12 toward or from the work carriage 15 by the application of pressure either through conduit 16 or 17, depending upon the direction of movement desired, it being noted, as shown in Fig. 4, that the cylinder is secured to and moves with the tool carriage 12 while the piston is the stationary member, a reversal of the more common practice. Also shown in Fig. 4 is a manual feed mechanism comprising a hand wheel 18 with suitable shaft 18a and gearing 19 and support 19a for the purpose of manually moving the tool carriage 12, the plan view position of this mechanism being also indicated in Fig. 1. Connection of both the manual and hydraulic feed shafts is made to a member 20 through a shaft 21 from the manual feed gearing and a shaft 22 from the hydraulic cylinder and piston unit 14. (Fig. 4.)

The mechanism by which fluid under pressure is fed to conduits 16 or 17 of cylinder and piston unit 14 for the purpose of automatic power actuated sliding movement of the tool carriage or wheelbase 12 toward and from the work will be described hereinafter, but it is important to consider the means whereby manual adjustment of this wheelbase movement is afforded in addition to and in combination with the power actuated movement of the wheelbase. This mechanism is shown in sufficiently complete detail in Fig. 4 and also by reference to Fig. 1. As the wheelbase is positioned in Fig. 4 it is in its maximum rear position, that is away from the work as far as its travel permits toward the right as viewed in Fig. 4. It is important to an understanding of the drawing to remember that the cylinder, of the cylinder and piston unit 14, is attached to and moves with the wheelbase and that the gearing unit 19, support 19a and member 20 are secured to the base 10 so that when fluid under pressure is fed into conduit 16 the reaction against the piston held stationary through shaft 22 reacting against the bed of the machine through member 20 and its supports, will cause the wheelbase 12 with its rotating wheels 13 to move toward the work, or toward the left as viewed in Fig. 4. If pressure is continued in conduit 16 the end wall 23 will finally contact the end of the piston and thus limit the power actuated travel. However, at that time or at any time during the power movement or without such power actuation, the slide 12 may be moved or adjusted manually by actuation of the handwheel 18 which will cause rotation of shaft 18a gearing 19 and threaded shaft 21 which rotates in a nut 24 secured inside member 20. It will be apparent on inspection of Fig. 4 that such rotation of shaft 21 as will cause nut 24 and member 20 to move toward the left will produce such relative movement as will allow pressure in conduit 16 to produce further movement of the carriage toward the work if the maximum power movement is already completed or if the parts are in the position now shown in Fig. 4 the manual control will move the wheelbase toward the work without hydraulic assistance. Adjustment in the opposite direction is also available as will be evident on inspection. It is apparent therefore that manual adjustment or actuation is always available in addition to hydraulic actuation.

The hydraulic means for producing movement of the work slide 15 is shown in sufficient detail by reference to the upper portion of Fig. 14 where a second hydraulic piston and cylinder unit 25 is shown, which is secured to the work carriage 15, and reacts against a connection 26 on the bed of the machine through a shaft 27. The back and forth movement of the work carriage 15 is effected by fluid pressure applied to the opposite ends of the cylinder unit 25 through conduits 28 or 29. The hydraulic pressure, from a source later to be described, is fed to the conduit 28 or 29 under the control of a reversing valve 31 and a shut-off valve 32. The controls for actuating these valves will be considered later, but it is sufficient for an understanding of this part of the diagram, to consider that the pressure may be fed into the conduits 28 or 29 selectively by actuation of control member 33, shown projecting from the upper portion of the reversing valve 31, an upper position of the control member 33 allowing pressure to flow in conduit 29, and a lower position allowing pressure to flow into conduit 28, it being understood that the opposite conduit is connected to release pressure when pressure is fed to the other. The shut-off valve 32 is for the purpose of effecting either a slow or fast movement of the work carriage 15 by directing fluid under pressure to the cylinder 25 either from conduit 34, which is a large volume line, for rapid movement or from conduit 35 which is a small volume line for slower movement, a check valve 35a being provided in line 35 to prevent flow away from valve 31.

The detailed internal construction of valves such as 31 and 32 is not important and a more or less conventional internal construction has been used for illustration which on consideration that the pistons are cylindrical and the recesses surround them the flow therethrough on the movements mentioned will be evident on inspection.

It will be evident on inspection of Fig. 14 and from the above statement, that when shut-off valve 32 is open it will connect large volume conduit 34 directly with conduit 36 which leads to the reversing valve 31. However, when the said valve 32 is closed it will allow the small volume conduit 35 to feed pressure to the conduit 36 and then into the reversing valve 31. The valve 32 is actuated by up and down movement of a control member 32a by mechanism later described herein. The large volume conduit 34 is provided with a throttle valve 37, relief valve 38 and has pressure supplied to it by a pump 39 which draws its supply of fluid from a sump 40. The pump 39, as well as other pump units later to be described, are driven from a motor 41. The necessary sump line connection on all units is designated by the numeral 45 and exhausts into sump 40.

Fluid under pressure for the small volume line 35 is supplied from a pump 42 which is driven from the motor 41 preferably through a variable speed connection 43. Conduit 35 also has a relief valve 44 to maintain a desired pressure. Relief valves 38 and 44 may be set to maintain desired pressures in their respective conduits 34 and 35.

The hydraulic pressure unit for actuating the tool or grinding wheelbase carriage 12 is also shown diagrammatically on Fig. 14 of the drawings. In the hook-up as shown, only one speed is provided for the movement of the tool carriage and therefore a reversing valve 50 is sufficient valve control for effecting movement toward and away from the work by selectively feeding fluid under pressure either into the previously mentioned conduits 16 or 17, which it will be remembered connect to opposite ends of the hydraulic cylinder and piston unit 14. The fluid under pressure is fed into the reversing valve 50 through a conduit 51 which is connected with a pump 52, which is also driven by the motor 41 previously mentioned. The conduit 51 is also provided with a throttle valve 53 and a relief valve 54 with an exhaust or sump line 55, thus making it possible to maintain a desired pressure determined by setting the relief valve 54.

Fig. 14 also shows in more or less diagrammatic form a headstock 60 for the work carriage 15, which is provided with a suitable driving motor 61. The tailstock 62 is also shown in Fig. 14 at the opposite end of the work carriage 15 and is provided with an hydraulic and piston unit 63 for hydraulic operation of its spindle 64. Pressure for retracting the spindle 64 is fed into the left hand end of the cylinder 63 through a conduit 65, which pressure pushes the unit against a spring 66 mounted in the opposite end of the cylinder. A hand operated valve 67 is provided in conduit 65, the conduit 65 being connected with the previously mentioned conduit 17, which also serves the tool carriage. The opposite end of the cylinder 63 is preferably connected to the sump line 46. Some of the headstock and tailstock parts are also shown on Figs. 1 to 4.

It is noted that conduit 65, which provides fluid for actuation of the footstock when the valve 67 is open, comes from the conduit 17 which feeds fluid to the cylinder and piston unit 14 to retract the wheel base away from the work and it is therefore apparent that the footstock can only obtain pressure for its operation when pressure is available in line 17 and therefore the work cannot be taken out or put in until the grinding wheels are retracted.

Referring to Fig. 14 and Figs. 10 and 11 a single control lever 70 mounted in a control box 71 on what amounts to a universal swivel unit 72 is provided. Considering the view of the lever 70 as shown in Fig. 14 and Fig. 10 the top of the lever may be swung to the right or left in an arc about a pin or shaft 73 which is also shown in Fig. 11 suitable bracket 74 supporting a second pivot 75 at right angles to the first for completing the universal joint being provided. The shaft 73 has a gear segment 76 secured thereto which meshes with a rack 77 in rack bar 78. It is evident on inspection of Figs. 10, 11 and 14 that a swinging of the lever 70 in an arc to the right or left in Figs. 10 and 14 will produce sliding movement of the rack bar 78 because of the connection effected by the gear segment 76 and the rack 77. Cam members 80, 81 are pivoted at 75 and are also secured to be moved about this pivot by the swinging of the lever in the plane parallel with the section of Fig. 4. The cam members 80, 81 are so shaped that a movement of the lever 70 to the right, as shown in Fig. 11 or backward, as shown in Figs. 10 and 14 will lower the projecting operating arm 50a of the reversing valve 50 and throw pressure into conduit 17 (the position of Fig. 14) while a movement in the opposite direction of the lever 70, (Fig. 11) will cause the cam member 80 to contact the projecting member 50a to push it upwardly thereby to actuate the reversing valve to throw a pressure into line 16 (The position from that shown in Fig. 14.)

The effect of the movement of the rack bar 78 (Fig. 14) to actuate the valve 31 and 32 will now be considered. As previously mentioned a swinging of the top of the lever 70 to the left will push the rack bar 78 to the right, as shown in Fig. 14, and this will push the projecting end of the operating member 32a of the shut-off valve 32 downwardly closing said valve, this movement being effected by the cam action on the central notch 83 in the rack bar. The same movement of the rack bar will cause the projecting portion 84 to contact the actuating member 33 of reversing valve 31 to push it upwardly. The position of the end member is shown at 85 and on consideration of Fig. 14 it will be apparent that this will throw presure into conduit 29 and move the work carriage toward the left, as viewed in Fig. 14. And also considering Fig. 14 and the valve 32, it will be apparent that the closed position of said valve, which is now effected, will cause a slow speed of movement of the work carriage toward the left. Again referring to Fig. 14, a further movement of the lever 70 toward the left will allow the projecting end of actuating lever 32a of shut-off valve 32, to fall into recess 86, thus opening said valve and by such opening throwing large volume displacement into the conduit 29, the relative position of member 33 controlling or reversing valve 39 not being changed in a vertical direction since it follows in a horizontal path to position 87, indicated in Fig. 14. It is therefore apparent that a high speed movement of the work carriage 15 toward the left is therefore produced.

Considering the movement of the lever 70 toward the right in Figs. 14 and 10 the projecting end of actuating member 32a of valve 32 will first be forced to the downward position to close the valve by the cam action on notch 83 and the same movement will cause the lower face 88 of the member 78 to push the projecting end of the lever 33 of reversing valve 31 downwardly, thus throwing pressure into conduit 28, and therefore causing movement of the work carriage toward the right, as shown in Fig. 14. This will be a slow movement since the valve 32 is closed. Further movement of the lever 70 toward the right will produce no change in the position of the reversing valve 31 since the end of member 33 will ride in a horizontal line on the face 88, but the end of the lever 32a of shut-off valve 32 will fall into recess 89, which will effect an opening of valve 32 and therefore throw higher pressure into conduit 28 and cause rapid movement of the work carriage 15 toward the right.

General reference has already been made to the hand lever 70 which because of its swivel mounting and the various parts attached thereto provides in a single lever a control for actuating the wheel slide, providing control of the carriage movement in two speeds all of which had already been mentioned in the description of Fig. 14. However, additional control is also effected through this lever 70 and it will also be generally described by reference to the diagrammatic showings on Figs. 14 and 15. Reference has already been made to the fact that lever 79 is moveable in an arc to the right and left, as viewed in Fig. 14, as well as backward and forward as viewed in this figure, and on inspection of Fig. 15, which is a plan view taken substantially on the line 15—15 of Fig. 14, it appears that a guide is provided in the top of the box 71, this guide is substantially T-shape, as shown in Fig. 15, and for purposes of description it will be advantageous to indicate the various positions which the lever may assume in its guide. For instance the lever as shown in Fig. 15 in cross section is now in neutral, however, if the lever is moved away from the operator to position (a) it will throw pressure into the line 17 as previously mentioned, and on inspection of Fig. 14 it is apparent that this will cause the tool carriage or wheel base 12 to move to the right as viewed in Fig. 14 or away from the work, a fact which can be checked by reference to Fig. 4. With the wheel base thus removed from the work, if it is next desired to align the work with the grinding wheels preparatory to bringing them up to the work, the lever for instance may be moved to position (b), which as previously noted will operate valves 32a and 31 to produce a slow speed movement of the carriage toward the right, as shown in Fig. 14. However, if a faster movement of the carriage is desired, it may be produced by moving the lever further to the right (Fig. 15), and this as previously described, will actuate valve 32a to produce a faster speed of movement of the work carriage 15. If movement of the work carriage is desired in the opposite direction, the lever 79 may be swung to the position (d) toward the left, which, as previously mentioned, will move rack bar 78 to effect a slow movement of the carriage 15 toward the left, and if a faster movement in the same direction is desired, the lever is moved further toward the left to position (e) and the valves will be positioned to produce this movement.

If the proper alignment of the work carriage with the wheels has been previously determined a small cam 103 (Fig. 15) may be secured to the edge of the work carriage 15 in a position approximately opposite a safety device unit 102, the approximate position of this unit may be noted on reference to the plan view of the grinding machine and also in more detail in Fig. 15. If the cam 103 is properly located on the carriage 15 the cam will contact a projecting member 101 (Fig. 15) of the safety device, and will push it inwardly as viewed in Fig. 15 to the dotted position. The result of the movement of the member 103, which has a pivoted lever 104 mounted at its end will be to move a bar 105 away from contact with the edge of the lever 79 thus allowing it to be moved along the vertical slot 106 shown in Fig. 15, or in other words to be moved toward the operator, and this movement cannot occur until the member 103 rides on the cam 101 which is a condition produced when the grinding wheels are in alignment with the work to be ground. As the lever 79 is moved toward the operator in slot 106 it carries with it a cam bar 107 which contacts the operating lever 108 of a limit switch 109, this limit switch, as shown by the electrical diagram in Fig. 15, on the closure thereof by the contact of cam bar 107 with the actuating lever 108, produces closure of the switch 110 by a conventional electrical circuit, well known in the art, diagrammatically shown in Fig. 15. This switch 110 controls the electrical circuit to the headstock motor 61 which causes the rotation of the work and therefore the first result of the movement of the lever 79 toward the operator is to start the headstock motor and to start the work rotating preparatory to grinding. As the lever is moved further toward the operator to the maximum position at the end of the slot, the result will be an actuation of valve 59, as previously described which will throw pressure into conduit 16 and cause movement of the tool carriage or wheel base toward the work and it will be remembered from the previous description with reference to Fig. 4 that this hydraulic actuation of the wheel base is supplemented by a hand adjustment or movement through the mechanism shown and described in the discussion of Fig. 4.

Provision is also made for manual movement of the work carriage 15 in addition to the hydraulic control. This mechanism being shown in Figs. 10, 12, and 13. A hand wheel 115 is shown in Fig. 12, the rotation of which causes a rotation of a pinion 116 meshing with a rack bar 117 attached to and under the work carriage 15. This connection is accomplished through a series of gears, and shaft, i. e., gears 118, 119, 120, 121, the gear 121 being connected with a long shaft which has the previously mentioned pinion 116 at its end. It will be apparent on inspection of Fig. 12 that rotation of hand wheel 115 will cause movement of the work carriage 15 if the gear 118 is secured to rotate with the hand wheel and thus put the gearing into movement. This fastening of the gear 118 to rotate with the hand wheel 115 is accomplished by a clutch 123 which is controlled by a lever 124 actuated from a cam 125 which is best seen by reference to Fig. 10 where it is apparent that the cam is attached to and moves with the rack bar 78 which controls the valves for hydraulic actuation of the work carriage as previously described. However, the cam 125 is so positioned, as will be evident on inspection of Fig. 10, that the lever 124 is actuated to engage clutch 123 only when the rack bar 78 is in neutral position, i. e., when there is no hydraulic operation of the work carriage. However, when the rack bar is moved away from its neutral position shown in Fig. 10, the lever 124 will drop down and open the jaws of the clutch and disconnect the hand wheel feed for the work carriage. Therefore the work carriage manual control unlike the wheel base manual control is not operable at the same time as the hydraulic feed, but is however always operable when the lever 79 is in a position which does not actuate the tool carriage hydraulically, and it is of course also possible to manually actuate the work carriage while the lever is in the previously mentioned slot 106 to hydraulically actuate the wheel base and therefore manual adjustment of the work carriage is possible during hydraulic operation of the wheel base.

Since the purpose of the grinding machine is to accurately grind several diameters simultaneously it is very important that adequate support be provided at or near each of these diameters. In the machine used for illustration four bearings are shown with four grinding wheels. The end bearings are partially supported by the footstock and headstock spindles respectively, but it is also important that adequate support be provided in the center of the shaft and for this purpose two back rests one of which is shown at 130, Fig. 7, and both of which assemblies for the two center bearings are supported in a so-called work cradle, 131, shown in Fig. 5 and also noted on the front view of the machine Fig. 2. Each of these back rests, as shown in Fig. 7 have two jaws, 132 and 133, which are pivoted at 134 and 135 respectively in such manner that adjusting screws 136 and 137 may be employed to act in a direction to hold the jaws toward the work, and said jaws 132 and 133 being held apart by a single spring 138. On each of the adjusting screws 136 and 137, there is provided a stop illustrated by the unit 139 on the screw 136. By securing this stop in position it is possible to back off the screw and again put it into the same adjustment. Inasmuch as the two jaws of the back rest are both held apart by a single spring they are quite adequately adjusted and equalized by adjustment of the screws 136 and 137 and are advantageously held in position by a minimum number of parts. Also on the work rest frame 131 there is supported a diamond holder 140 and since it projects outwardly a considerable distance and is located between the normal position of the wheels it is possible to retract the wheels to a position where they may be suitably dressed by the diamond on movement of the work carriage past the wheels. The location of this member is shown in Fig. 8. The work rest 131 is secured to the work slide 15 by suitable bolt fastenings or other means such as shown at 141 in Fig. 9. Fig. 9 also shows a support provided adjacent the end of the work rest for supporting the end bearings adjacent the footstock and headstock, this support is a V-block 142 shown in Fig. 9 and is sufficient support for the end bearings supplementing the support of the footstock and headstock spindles.

While in the description of the hydraulic unit reference has been made to the diagrammatic views of Fig. 14, and also general reference to other detail views of various parts of the device, it is noted that these several units may be traced to their position on the general views of the completed machine by following reference numerals for principal units placed on these views for reference in tracing the locations of the several units on the completed machine.

Although description has been given of a specific grinding machine to show the application of the principles of the invention to an operable structure, it is understood that the principles of construction may be applicable to various designs of machine tools and although some features are particularly applicable to grinding machines only, other features may also be applicable to other types of machine tools.

I claim:

1. A control mechanism for machine tools having a plurality of moveable members actuated by a plurality of fluid pressure operated mechanisms comprising a single control lever, a universal mounting for said control lever allowing said lever to be swung into planes of movement substantially at right angles to each other, a reversing valve for controlling fluid pressure to one of said fluid pressure operated mechanisms, a second reversing valve for controlling fluid pressure to another of said fluid pressure operated mechanisms, cam members connected to the projecting end of said lever for actuating said first mentioned reversing valve when said lever is moved in one plane of movement, and a second cam member moveable to actuate said second mentioned reversing valve, and connections from said lever to said second cam member to cause actuation of said cam member when said lever is swung in the other plane of movement.

2. A control mechanism for a machine tool having a reciprocating work carriage and a tool carriage moveable toward and from the work carriage with a fluid pressure operated mechanism for moving each of said carriages comprising a high pressure source of fluid pressure and a low pressure source of fluid pressure connected to produce fast or slow movement of said work carriage, a valve for selectively applying said high pressure or said low pressure, a third source of fluid pressure for actuating said fluid pressure mechanism for said tool carriage, a reversing valve for controlling flow to said work carriage fluid pressure mechanism, a second reversing valve for controlling flow to said tool carriage fluid pressure mechanism, and a single operating lever connected to selectively operate said valve and said reversing valve to actuate said carriage for slow or fast movement in either direction and to operate said second reversing valve to actuate said tool carriage.

3. A fluid pressure actuating and control mechanism for a reciprocating member moveable on a machine tool comprising a reversible fluid pressure motor for actuating said movable member a low pressure source of fluid pressure for actuating said fluid motor and said member at a slow speed, a higher pressure source of fluid pressure for actuating said fluid motor and said member at a higher speed, a valve for selectively applying said high or low source of fluid pressure to said fluid motor, a reversing valve for selectively directing fluid to said reversible fluid motor to selectively drive said motor in the direction desired and a single manual control mounted to selectively actuate said reversing valve and said valve applying said high or low pressure source of fluid pressure.

4. A fluid pressure actuating and control mechanism for a reciprocating member movable on a machine tool comprising a reversible fluid pressure motor for actuating said moveable member a low pressure source of fluid pressure for actuating said fluid motor and said member at a slow speed, a higher pressure source of fluid pressure for actuating said fluid motor and said member at a higher speed, a valve for selectively applying said high or low source of fluid pressure to said fluid motor, a reversing valve for selectively directing fluid to said reversible fluid motor to selectively drive said motor in the direction desired, a single control lever mounted to be swung to a plurality of positions, a cam bar mounted to operate said reversing valve and said valve applying high or low source of fluid pressure on sliding movement thereof, and a connection from said sliding cam bar to said single control lever, whereby on swinging movement of said lever said cam bar is selectively positioned to actuate said fluid pressure motor in the direction and at the speed desired.

5. In a control for a fluid pressure operated mechanism for a machine tool having a reciprocating work carriage and a tool carriage moveable toward and from the work carriage, a reversible fluid pressure motor for actuating said work carriage, a second reversible fluid pressure motor for actuating said tool carriage, a low pressure source of fluid pressure for actuating said first mentioned fluid motor and said work carriage at a slow speed, a higher pressure source of fluid pressure for actuating said first mentioned fluid motor and said work carriage at a higher speed, a valve for selectively applying said high or low source of fluid pressure to said first mentioned fluid motor, a reversing valve for selectively directing fluid to said first mentioned reversible fluid motor to selectively drive said motor and said work carriage in the direction desired, a third source of fluid pressure for actuating said second mentioned fluid motor and said tool carriage, and a second reversing valve for selectively directing fluid to said second mentioned fluid motor to selectively drive said motor and said tool carriage in the direction desired.

6. In a control for a fluid pressured operated mechanism for a machine tool having a reciprocating work carriage and a tool carriage moveable toward and from the work carriage, a reversible fluid pressure motor for actuating said work carriage a second reversible fluid pressure motor for actuating said tool carriage, a low pressure source of fluid pressure for actuating said first mentioned fluid motor and said work carriage at a slow speed, a higher pressure source of fluid pressure for actuating said first mentioned fluid motor and said work carriage at a higher speed, a valve for selectively applying said high or low source of fluid pressure to said first mentioned fluid motor, a reversing valve for selectively directing fluid to said first mentioned reversible fluid motor to selectively drive said motor and said work carriage in the direction desired, a third source of fluid pressure for actuating said second mentioned fluid motor and said tool carriage, and a second reversing valve for selectively directing fluid to said second mentioned fluid motor to selectively drive said motor and said tool carriage in the direction desired, and a single manual control mounted to selectively actuate said reversing valve for said work carriage, said valve applying high or low pressure and said second reversing valve controlling said tool carriage.

7. In a control for a fluid pressure operated mechanism for a machine tool having a reciprocating work carriage and a tool carriage moveable toward and from the work carriage, a reversible fluid pressure motor for actuating said work carriage, a second reversible fluid pressure motor for actuating said tool carriage, a low pressure source of fluid pressure for actuating said first mentioned fluid motor and said work carriage at a slow speed, a higher pressure source of fluid pressure for actuating said first mentioned fluid motor and said work carriage at a higher speed, a valve for selectively applying said high or low source of fluid pressure to said first mentioned fluid motor, a reversing valve for selectively directing fluid to said first mentioned reversible fluid motor to selectively drive said motor and said work carriage in the direction desired, a third source of fluid pressure for actuating said second mentioned fluid motor and said tool carriage, and a second reversing valve for selectively directing fluid to said second mentioned fluid motor to selectively drive said motor and said tool carriage in the direction desired, a single control lever, a universal mounting for said control lever allowing said lever to be swung into planes of movement substantially at right angles to each other, cam members connected to the projecting end of said lever for actuating said second reversing valve when said lever is moved in one plane of movement, a second cam member moveable to actuate said reversing valve controlling said work carriage and said valve for selectively applying high and low sources of fluid pressure, and connections from said lever to said second cam member to cause actuation of said cam member when said lever is swung in its other plane of movement.

CONRAD L. OTT.